United States Patent
Knudsen et al.

(10) Patent No.: US 6,633,715 B2
(45) Date of Patent: Oct. 14, 2003

(54) OPTICAL FIBER HAVING NEGATIVE DISPERSION, NEGATIVE DISPERSION SLOPE AND LARGE EFFECTIVE AREA

(75) Inventors: Stig Nissen Knudsen, Copenhagen (DK); Morten Ostergaard Pedersen, Broendby Strand (DK)

(73) Assignee: Fitel USA Corp., Norcross, GA (US)

( * ) Notice: Subject to any disclaimer, the term of this patent is extended or adjusted under 35 U.S.C. 154(b) by 14 days.

(21) Appl. No.: 10/016,065

(22) Filed: Dec. 6, 2001

(65) Prior Publication Data

US 2003/0113084 A1 Jun. 19, 2003

(51) Int. Cl.⁷ .............. G02B 6/02; G02B 6/22; G02B 6/18
(52) U.S. Cl. .............. 385/127; 385/123; 385/124; 385/127
(58) Field of Search ................... 385/123, 124, 385/126, 127, 128

(56) References Cited

U.S. PATENT DOCUMENTS

| | | | | | |
|---|---|---|---|---|---|
| 5,905,838 | A | * | 5/1999 | Judy et al. | 385/123 |
| 6,091,873 | A | * | 7/2000 | Matsuo et al. | 385/123 |
| 6,490,397 | B2 | * | 12/2002 | Kato et al. | 385/123 |
| 2002/0006259 | A1 | * | 1/2002 | Tirloni | 385/127 |
| 2003/0031440 | A1 | * | 2/2003 | Dennis et al. | 385/123 |

FOREIGN PATENT DOCUMENTS

| | | |
|---|---|---|
| EP | 0 938 001 A | 8/1999 |
| EP | 1 004 905 A | 5/2000 |
| EP | 1 111 414 A | 6/2001 |

OTHER PUBLICATIONS

Pending U.S. patent application No. 09/844,643, Positive Dispersion Optical Fiber Having Large Effective Area (Apr. 27, 2001).

"Ultra Low Nonlinearity Low Loss Pure Silica Core Fiber," Electronics Letters Online No.: 19991094, Aug. 3, 1999.

Yangsheng Gao, et al, "Attenuation–Optimized Dispersion–Flattened Quadruple . . ." IEEE Photonics Tech Ltrs, Jun. 1, 1992, vol. 4, No. 6, Page 639, Column 1, para. 3 –page 640, column 1, para 2, US.

Furukawa Electric, Patent Abstracts, Feb. 5, 2000, vol. 2000, No. 13 Figures 1, 2C, Japan.

(List continued on next page.)

Primary Examiner—Brian Healy
Assistant Examiner—Kevin S Wood
(74) Attorney, Agent, or Firm—John M. Harman

(57) ABSTRACT

Embodiments of the invention include an optical communications system with optical fiber cable, coupled between optical transmission and receiving devices, having positive dispersion fiber and corresponding inverse dispersion fiber. The inverse dispersion fiber includes a doped core region with an index of refraction $n_1$, a cladding region with an index of refraction $n_2$, and a trench region, a first barrier region and a second barrier region with indices of refraction $n_3$, $n_4$, and $n_5$, respectively, formed between the doped core region and the cladding region. The various regions of the inverse dispersion fiber are manufactured in such a way that the refractive index value ranges are, e.g., $0.745\% < (n_1-n_2)/n_2 < 0.759\%$, $-0.403\% < (n_3-n_2)/n_2 < -0.394\%$, $0.152\% < (n_4-n_2)/n_2 < 0.166\%$, and $-0.083\% < (n_5-n_2)/n_2 < -0.041\%$. Inverse dispersion fiber has a chromatic dispersion of approximately –40 picosecond/(nanometer-kilometer) and a relatively large effective core area, $A_{eff}$, e.g., greater than approximately 30.0 $\mu m^2$, both at a wavelength of 1550 nm.

14 Claims, 7 Drawing Sheets

OTHER PUBLICATIONS

Lou Jie, et al, "Non–Zero Dispersion Shifted Fiber With Low Dispersion Slope", Asia Pacific Conference on Communiations, Oct. 18, 1999, vol. 2, pp. 1373–1374.

Le Nguyen Bin, et al, "Generalized Approach to Single–Mode Dispersion–Modified Optical Fiber Design," Optical Engineering, Soc. of Photo–Optical Instrumentation Engineers, Aug. 1, 1996.
Vol. 35, No. 8, pp. 2250–2261, US.

Welling F., et al, "The Design of Dispersion Flattened Single–Mode Fibers," Sep. 11–15, 1988, vol. Part 1, Conf. 14, pp. 457–460, London.

Cohen L. G. et al., "Loss–Loss Quadruple–Clad Single–Mode Lightguides With Dispersion . . . " Nov. 25, 1982, Electronics Letters, IEE, vol. 18, No. 24, pp. 1023–1024, Great Britain.

* cited by examiner

OPTICAL FIBER HAVING NEGATIVE DISPERSION, NEGATIVE DISPERSION SLOPE AND LARGE EFFECTIVE AREA

BACKGROUND OF THE INVENTION

1. Field of the Invention

The invention relates to negative dispersion optical fiber. More particularly, the invention relates to negative dispersion, negative dispersion slope optical fiber having improved transmission characteristics including improved dispersion slope compensation.

2. Description of the Related Art

Optical fibers are thin strands of glass or plastic capable of transmitting optical signals, containing relatively large amounts of information, over long distances and with relatively low attenuation. Typically, optical fibers are made by heating and drawing a portion of an optical preform comprising a refractive core region surrounded by a protective cladding region made of glass or other suitable material. Optical fibers drawn from the preform typically are protected further by one or more coatings applied to the cladding region.

In an effort to improve transmission capacity of optical fibers, wavelength division multiplexing (WDM) systems are used. In general, WDM systems multiplex a plurality of information channels onto a single fiber, with each channel operating at a different wavelength. Typically, WDM system arrangements include a positive dispersion fiber (PDF) concatenated with a negative dispersion fiber such as a dispersion compensating fiber (DCF) or an inverse dispersion fiber (IDF). The positive dispersion fiber typically comprises a single mode fiber designed to introduce dispersion to reduce the nonlinear interactions between channels. The negative dispersion fibers have negative dispersion to compensate for the linear effects of accumulated dispersion. Typically, dispersion compensating fibers are used on spools in discrete modules that are concatenated with the positive dispersion fiber. Thus, dispersion compensating fibers do not contribute to the transmission distance but still add discrete loss and polarization mode dispersion to the system. For cabling operations, where fiber used to compensate the dispersion of the positive dispersion fiber is deployed in the cable and thus contributes to the transmission distance, inverse dispersion fiber is used.

It would be desirable to have negative dispersion fiber such as an inverse dispersion fiber with improved characteristics such as increased effective area, e.g., for reduction of nonlinear impairments therein, and improved dispersion slope compensation of positive dispersion optical fibers, e.g., for broadband dispersion compensation.

SUMMARY OF THE INVENTION

The invention is embodied in an optical communications system including one or more optical transmission devices, one or more optical receiving devices, and at least one optical fiber cable coupled therebetween that includes at least one positive dispersion optical fiber and corresponding inverse dispersion optical fiber. According to embodiments of the invention, the inverse dispersion fiber has negative dispersion and a negative dispersion slope. The inverse dispersion fiber includes a doped core region with an index of refraction $n_1$, a cladding region with an index of refraction $n_2$, and a trench region, a first barrier region and a second barrier region with indices of refraction $n_3$, $n_4$, and $n_5$, respectively, formed between the doped core region and the cladding region. Inverse dispersion fiber according to embodiments of the invention has a chromatic dispersion of approximately −40 picosecond/(nanometer-kilometer) and a relatively large effective core area, $A_{eff}$, e.g., greater than approximately 30.0 $\mu m^2$, both at a wavelength of 1550 nanometers. The various regions of the inverse dispersion fiber are manufactured in such a way that the refractive index value ranges are, e.g., $0.745\% < (n_1-n_2)/n_2 < 0.759\%$, $-0.403\% < (n_3-n_2)/n_2 < -0.394\%$, $0.152\% < (n_4-n_2)/n_2 < 0.166\%$, and $-0.083\% < (n_5-n_2)/n_2 < -0.041\%$. Manufacture of the optical fiber includes manufacture of the core region having a diameter of approximately 4.36 $\mu m$, the trench region having a diameter of approximately 10.92 $\mu m$, and the first barrier region having a diameter of approximately 18.28 $\mu m$. The core region is doped, e.g., with germanium or other suitable material. The trench region, the first barrier region, the second barrier and the cladding region are doped, e.g., with germanium and/or fluorine, and/or other suitable material(s). Inverse dispersion optical fiber according to embodiments of the invention provides improved compensation of positive dispersion optical fibers, including existing positive dispersion optical fibers.

BRIEF DESCRIPTION OF THE DRAWINGS

In the drawings:

FIG. 3b is a graphical diagram of a refractive index profile of the optical fiber shown in FIG. 3a;

FIG. 5b is a graphical diagram of a refractive index profile of the optical fiber shown in FIG. 5a;

DETAILED DESCRIPTION

Figure 1:
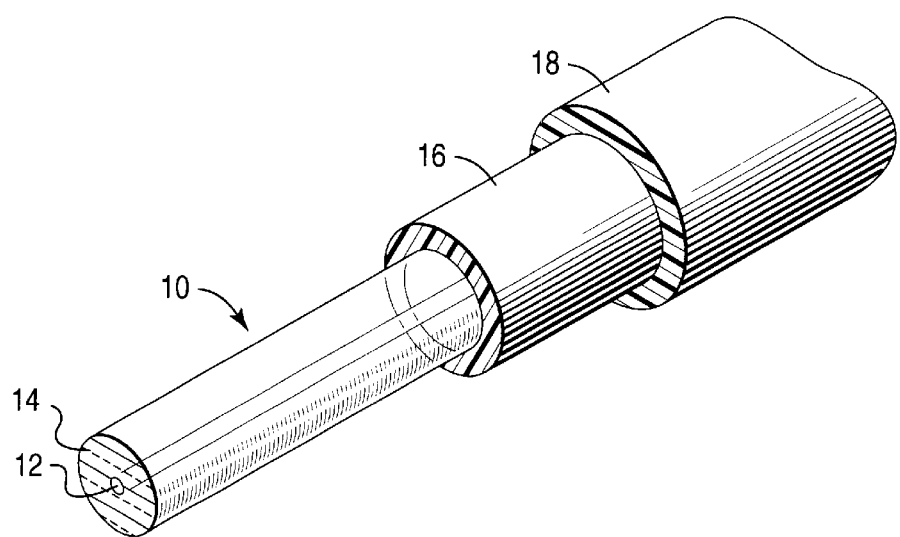
FIG. 1 is a perspective view of a conventional coated optical fiber.

In the following description, similar components are referred to by the same reference numeral in order to enhance the understanding of the invention through the description of the drawings. Also, unless otherwise explicitly specified herein, the drawings are not drawn to scale.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Commercially viable optical fibers involve the cooperation of numerous fiber design considerations. In general, it is desirable for the fiber transmission loss to be relatively low, for the fiber to be able to tolerate a modest amount of bending without experiencing excessive loss, and for the fiber to have a certain dispersion over a given wavelength range. Also, it is desirable for the slope of the dispersion to be similar to that of a corresponding fiber having similar dispersion value but of the opposite sign. Also, it is desirable for the fiber to have a relatively large effective area, and for the fiber to have a cutoff wavelength that is appropriate for single mode transmission at the system wavelength. Although high quality glass materials have been developed that provide low transmission loss, high quality glass alone is insufficient to satisfy all the desirable features of commercially viable optical fibers.

Many desirable features are addressed, e.g., by the refractive index profile of the fiber, which shows how the index of refraction of the fiber varies as a function of distance from its central axis. Parameters used for describing the refractive index profile generally are referenced to the index of refraction of the outermost layer of glass. Idealized models of refractive-index profile typically comprise axially symmetric rings or regions of different refractive index. However, changing the number, size and/or shape of any one of these regions generally impacts more than one characteristic of the fiber (e.g., dispersion slope is reduced, but bending loss is increased or effective area is decreased). Thus, it is a significant design effort to create a refractive index profile that provides most if not all of the desired features and yet still is readily manufacturable.

Optical fiber bandwidth is affected by many factors, including dispersion. For example, in multimode fiber, modal dispersion results when pulses of light that enter one end of the fiber are spread as they emerge from the other end of the fiber. Modal dispersion occurs because multimode fiber supports many different modes (paths) of a particular wavelength, and when the different modes are combined at the other end of the fiber, the net result is a spreading of the input pulse. Typically, modal dispersion is undesirable. Also, the term dispersion typically means chromatic or "linear" dispersion. Conventionally, the sign of the dispersion is positive when short-wavelength radiation has greater velocity than long-wavelength radiation.

Single mode fiber is optical fiber designed to support only the fundamental mode ($LP_{01}$) of a particular wavelength. Single mode fiber, which has a bandwidth that is much greater than multimode fiber, transmits optical signals at proportionally greater transmission rates. Nevertheless, single mode fiber behaves as though it is a multimode fiber for wavelengths that are shorter than the $LP_{11}$ or $LP_{02}$ cutoff wavelength (whichever is the longest wavelength for the particular design), which is determined by the core radius (a), index of refraction (n), and fractional core/cladding index difference ($\Delta$). Also, the widths and indices of other layers in the fiber affect the $LP_{11}$ or $LP_{02}$ cutoff wavelength. As $\Delta$ and a decrease, fewer and fewer modes propagate until only one mode propagates at wavelengths longer than the $LP_{11}$ or $LP_{02}$ cutoff wavelength. Accordingly, the $LP_{11}$ or $LP_{02}$ cutoff wavelength needs to be shorter, by a suitable amount, than the wavelengths to be transmitted.

Referring now to FIG. 1, shown is a conventional coated optical fiber 10, e.g., an optical fiber in which embodiments of the invention are useful therewith. The optical fiber 10 includes a light-carrying core region 12 and a cladding region 14 surrounding the core region 12. The core region 12 and the cladding region 14 generally are made of glass and typically are drawn from a glass preform, as discussed previously herein.

The diameter of the core region 12 is approximately 5–8 $\mu$m for conventional single mode fiber and approximately 50 or 62.5 microns ($\mu$m) for conventional multimode fiber. Although the diameter of the core region 12 varies depending on whether the fiber is single mode or multimode, the total diameter of the cladding region 14 surrounding the core region 12 typically is approximately 125 $\mu$m.

The cladding region 14 is covered, for protection and strength, with one or more coatings, e.g., a primary coating layer 16 and a secondary coating layer 18, typically resulting in a total outer diameter of approximately 245–1000 $\mu$m. The secondary coating layer 18 generally has a relatively high modulus, e.g., $10^9$ Pascals (Pa), to withstand handling. The primary coating layer 16 has a relatively low modulus, e.g., $10^6$ Pa, to provide a cushion that reduces microbending losses.

Figure 2:
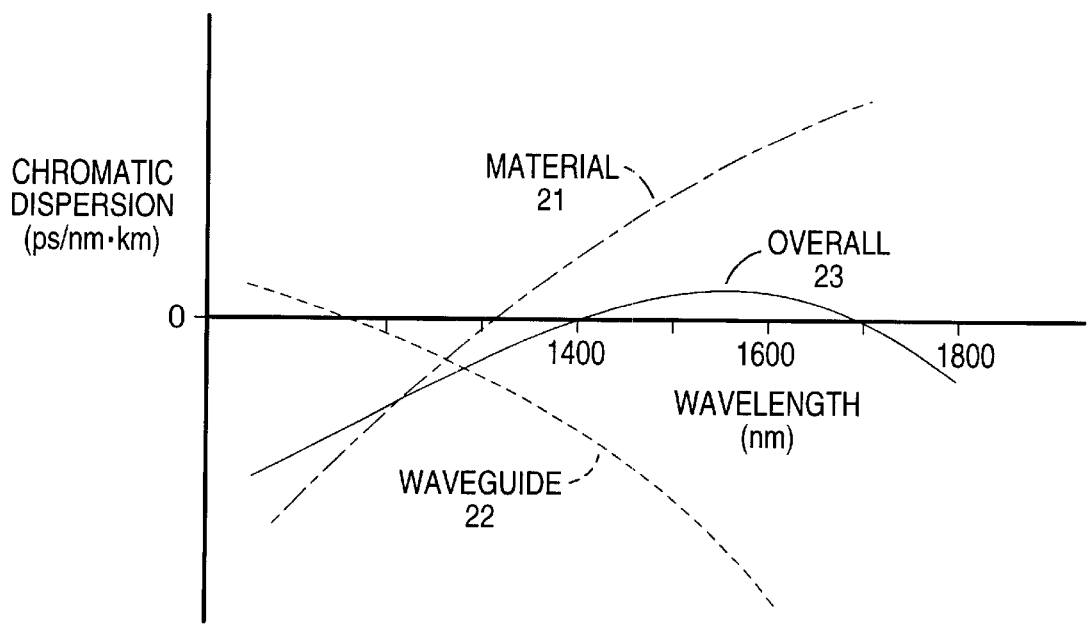
FIG. 2 is a graphical diagram of the overall chromatic dispersion of a conventional dispersion-flattened optical fiber, as a function of wavelength, showing its material dispersion and waveguide dispersion components.

Referring now to FIG. 2, shown graphically is the chromatic dispersion of an optical fiber such as the conventional optical fiber 10 shown in FIG. 1. In particular, FIG. 2 shows graphically how an overall dispersion-flattened characteristic 23 is created through the additive combination of material dispersion 21 and waveguide dispersion 22. Dispersion-flattened fibers generally have zero dispersion at two wavelengths, e.g., at 1400 nanometers (nm) and 1700 nm.

The material dispersion 21 is intrinsically associated with the actual material used in making the optical fiber. In FIG. 2, the material dispersion 21 is associated with silica glass. Waveguide dispersion 22 is a function of the refractive-index profile of the fiber. Unlike material dispersion, waveguide dispersion is affected, within limits, by the design engineer. The particular refractive-index profile that has yielded the overall dispersion-flattened characteristic 23 has been used in the design of dispersion-flattened fibers in which the chromatic dispersion is reduced over the broad wavelength region extending from 1400–1700 nm.

Figure 3A:
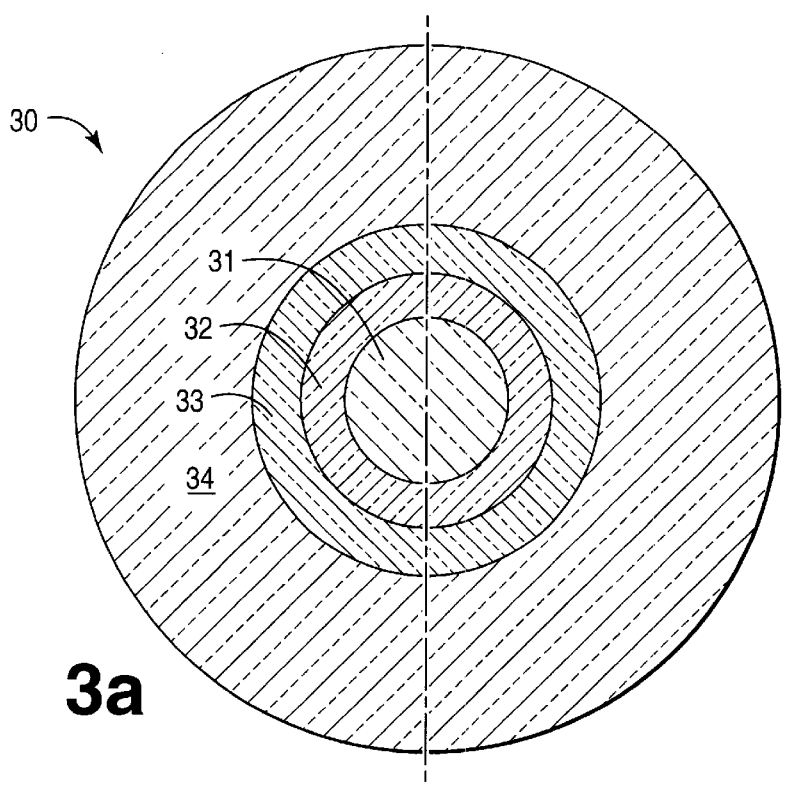
FIG. 3a is a cross-section view of a conventional uncoated optical fiber, showing several layers of different refractive index materials.

Referring now to FIG. 3a, shown is a cross section of an uncoated glass fiber 30, showing an arrangement of a plurality of layers 31, 32, 33, 34, each having a different index of refraction for modifying the waveguide dispersion characteristic of the fiber 30. Although the layers 31–34 suggest that changes in refractive index are abrupt between layers, such is not necessarily the case. Often, gradual index changes between adjacent layers are used, resulting in graded index fibers. However, to facilitate an understanding of conventional arrangements and embodiments of the invention, abrupt changes are shown here and in other Figs. It is understood that embodiments of the invention also contemplate graded index fibers.

The optical fiber 30 comprises a central core region 31, whose index of refraction nominally is $n_1$. The central core region 31 is surrounded by a first annular ring or region 32, which has a nominal refractive index $n_3$. The first region 32 is surrounded by a second annular ring or region 33, which has a nominal refractive index $n_4$. An outer cladding 34 of nominal refractive index $n_2$ (e.g., 1.45) surrounds the second region 33. It should be noted that FIG. 3a is not drawn to scale (the diameter of cladding layer 34 is approximately 125 $\mu$m, while the diameter of the core region 31 is approximately 8 $\mu$m, e.g., for single mode fiber).

Figure 3B:
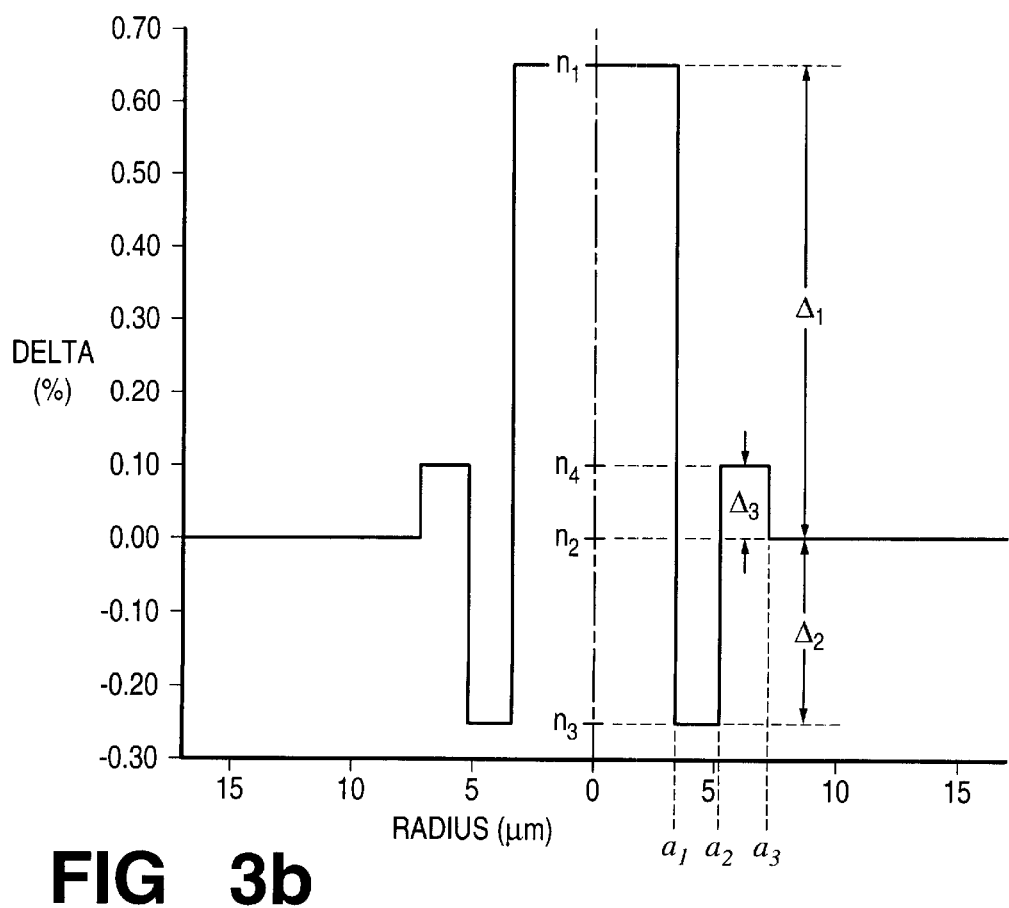

Referring now to FIG. 3b, shown is a refractive index profile of the fiber 30 shown in FIG. 3a. Rather than graphing the refractive-index profile using the actual values of the index of refraction, it is convenient and conventional to show the refractive-index profile as a function of normalized refractive-index differences $\Delta_1$, $\Delta_2$ and $\Delta_3$, which are defined as follows: $\Delta_1=(n_4-n_2)/n_2 \times 100\%$, $\Delta_2=(n_3-n_2)/n_2 \times 100\%$, and $\Delta_3=(n_4-n_2)/n_2 \times 100\%$. With respect to the refractive index profile, the area corresponding to the core region 31 in FIG. 3a has an outer radius $a_1$. The area corresponding to the first region 32 has an outer radius $a_2$ and an inner radius is $a_1$. The area corresponding to the second region 33 has an outer radius $a_3$ and an inner radius $a_2$. In this particular conventional arrangement, $\Delta_1=0.65$, $\Delta_2=-0.25$ and $\Delta_3=0.10$. Also, in this particular arrangement, $a_1=3.4$ $\mu$m, $a_2=5.2$ $\mu$m, and $a_3=7.2$ $\mu$m. Thus, the width of the first region 32 is 1.8 $\mu$m (5.2 $\mu$m–3.4 $\mu$m), and the width of the second region 33 is 2.0 $\mu$m (7.2 $\mu$m–5.2 $\mu$m).

Optical fibers having refractive-index profiles like the one shown in FIG. 3b typically comprises a silica core doped with germanium or other suitable material, a first annular ring or region doped with fluorine and/or other suitable material, a second annular ring or region doped with germanium and/or other suitable material, and a pure silica outer cladding. Typically, doping silica with germanium or similar material increases the index of refraction of the resulting doped material, and doping silica with fluorine or similar material decreases the index of refraction of the resulting doped material.

As discussed previously herein, many optical fiber transmission systems such as wavelength division multiplexing (WDM) systems include a dispersion compensating arrangement having an optical cable with positive dispersion fiber (PDF) concatenated with inverse dispersion fiber (IDF). The positive dispersion fiber introduces positive dispersion (often with positive dispersion slope), e.g., to reduce the nonlinear interactions between channels. The inverse dispersion fiber reduces the introduced and otherwise accumulated dispersion. The inverse dispersion fiber has negative dispersion and negative dispersion slope that results in broadband compensation of the PDF.

Figure 4A:
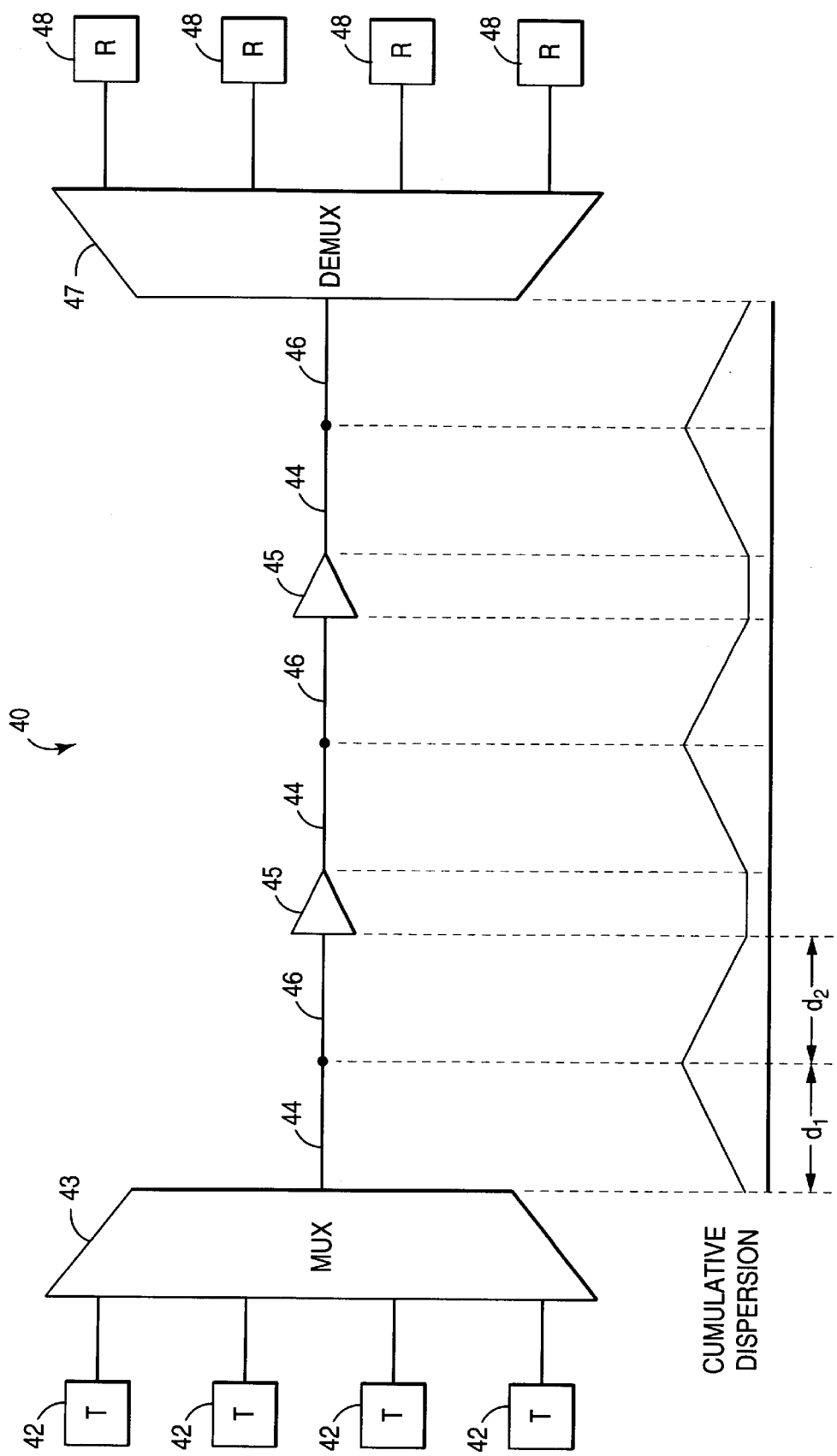
FIG. 4a is a simplified schematic diagram of an optical system arrangement in which negative dispersion fibers according to embodiments of the invention are useful.
Figure 4B:
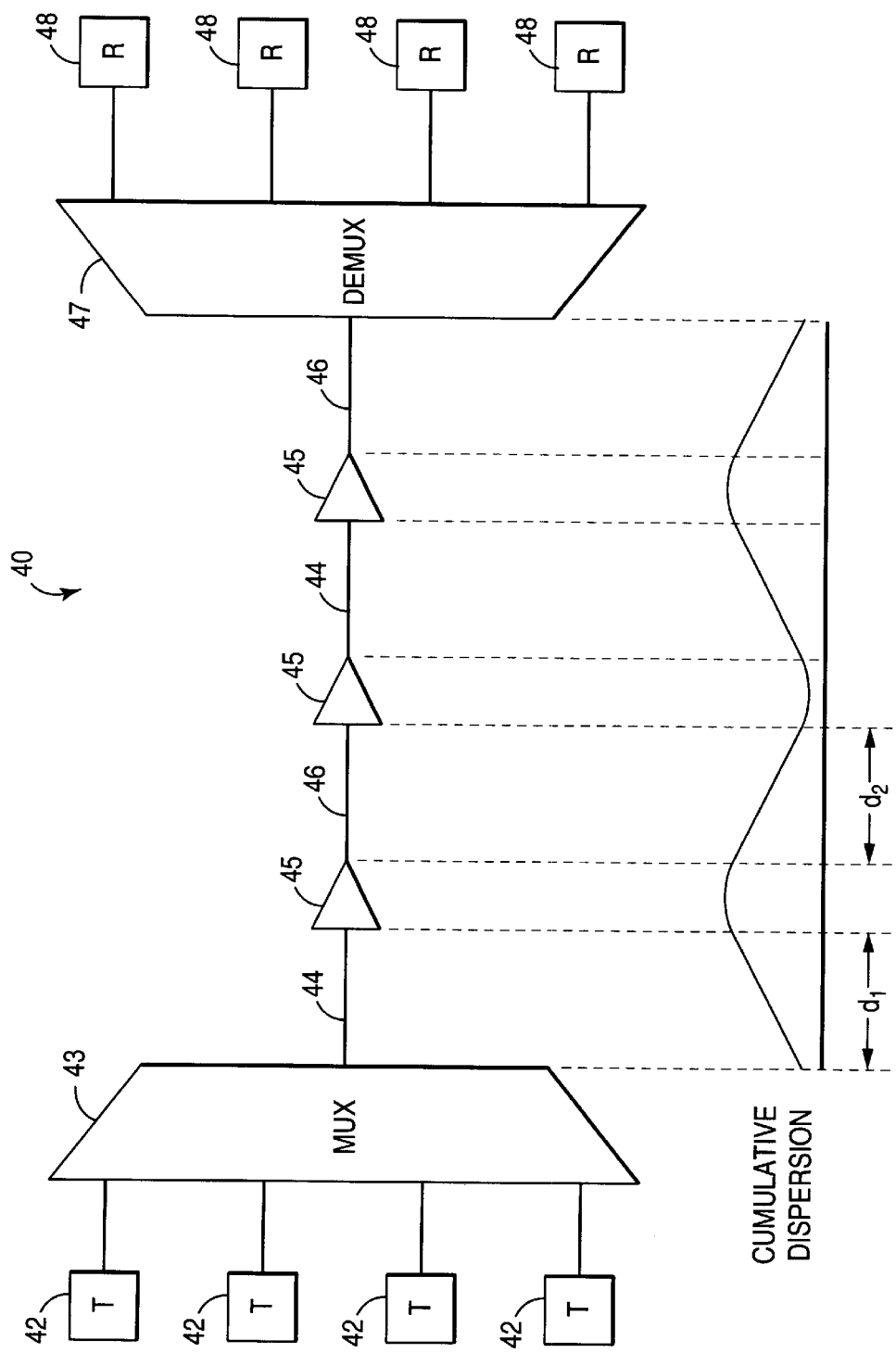
FIG. 4b is a simplified schematic diagram of another optical system arrangement in which negative dispersion fibers according to embodiments of the invention are useful.

Referring now to FIGS. 4a–b, shown are simplified schematic diagrams of various system arrangements in which inverse dispersion fibers according to embodiments of the invention are useful. The optical communications system 40 includes one or more optical sources or transmitters 42, which modulate wavelengths, e.g., in the 1530–1565 nm (C-band) region and the 1565–1610 nm (L-band) region, with different baseband signals. The modulated wavelengths are combined, e.g., via a multiplexer or other suitable coupler (shown as 43), and introduced into a fiber transmission line combination that includes, e.g., a positive dispersion optical fiber 44, an optical amplifier 45, and an inverse dispersion fiber 46. In the arrangement shown in FIG. 4a, the positive dispersion fiber 44 is spliced or otherwise coupled directly to the inverse dispersion fiber 46, which is coupled at the other end thereof to the optical amplifier 45. Alternatively, in the arrangement shown in FIG. 4b, the optical amplifier 45 is coupled between positive dispersion fiber 44 and inverse dispersion fiber 46. Also, in another alternative arrangement (not shown), the positive dispersion optical fiber 44 is coupled between an optical amplifier 45 and an inverse dispersion fiber 46, which is coupled between two positive dispersion optical fibers 44 (i.e., the arrangement is as follows: positive dispersion optical fiber 44, optical amplifier 45, positive dispersion fiber 44, inverse dispersion fiber 46, positive dispersion fiber 44, optical amplifier 45, etc.). At the receiver end, the transmitted optical channels are split, e.g., by a demultiplexer 47, according to their wavelengths, and processed by receivers 48 to extract the individual baseband signals.

It should be noted that the lengths or spans of the positive dispersion fiber and the inverse dispersion fiber in the illustrated diagrams are not drawn to scale. The ratio of the length of the positive dispersion fiber to the inverse dispersion fiber typically is approximately 1:1 or 2:1. Depending on the specific application, other suitable ratios are useful. However, according to embodiments of the invention, the ratio typically is between 1:1 and 3:1 and, depending on the application, can be even higher than 3:1.

FIGS. 4a–4b also illustrate generally the cumulative dispersion imparted by the positive and negative dispersion fibers. For example, in FIG. 4b, the sources 42 launch light into the positive dispersion fiber portion of the transmission line combination. As the light travels a given distance, e.g., $d_1$, the positive dispersion fiber 44 introduces or imparts a given amount of positive dispersion on the transmission signal. The transmission signal then is amplified, e.g., by the optical amplifier 45, and then travels through the inverse dispersion fiber 46, which offsets or reduces positive dispersion by introducing negative dispersion to the transmission signal. Once the transmission signal has traveled through the inverse dispersion fiber 46 a given distance, e.g., $d_2$, the amount of negative dispersion imparted on the transmission signal offsets or compensates for at least some, all or even more than the amount of positive dispersion imparted by the positive dispersion fiber 44.

The amount of dispersion compensation provided by the inverse dispersion fiber 46 depends, inter alia, on the length of the inverse dispersion fiber 46 and the amount of negative dispersion introduced thereby relative to the length of the positive dispersion fiber 44 and the amount of positive dispersion introduced thereby. Also, although inverse dispersion fibers reduce or offset much of the dispersion introduced into an optical fiber transmission system, inverse dispersion fibers tend to exhibit higher signal attenuation and lower effective area than, e.g., non-dispersion compensating fibers. Also, because the length of inverse dispersion fiber is part of the actual transmission distance, the desired amount of local dispersion in the IDF often is difficult to determine because inverse dispersion fibers have inherent design tradeoffs, e.g., between dispersion and parameters such as attenuation and effective area. Desirably, positive dispersion fiber and dispersion compensating fiber have equal magnitudes of the relative dispersion slope (RDS= dispersion slope/dispersion). In this manner, when a fiber arrangement combines positive dispersion fibers and IDF or dispersion compensating fibers for a zero net dispersion, the net dispersion slope also is zero, thus yielding broadband compensation.

According to embodiments of the invention, an optical fiber communications system includes inverse dispersion fiber with improved characteristics such as increased effective area and improved compensation of positive dispersion optical fiber in the system, e.g., in terms of dispersion slope matching and local dispersion of inverse dispersion fiber for better span performance. Inverse dispersion fiber according to embodiments of the invention has a relatively large effective core area, $A_{eff}$, e.g., greater than approximately 30.0 $\mu m^2$ at a wavelength of 1550 nm (for systems having a 2:1 ratio), and typically provides at least 90% and typically between 95–110% compensation of corresponding positive dispersion fiber. Also, inverse dispersion fiber according to embodiments of the invention has a chromatic dispersion of approximately −40 picosecond/(nanometer-kilometer) and a dispersion slope of approximately −0.124 ps/nm²-km at a wavelength of 1550 nm.

Inverse dispersion fiber according to embodiments of the invention is suitable for use with existing positive dispersion optical fiber such as the positive dispersion fiber disclosed in the co-pending application "Positive Dispersion Optical Fiber Having Large Effective Area", Ser. No. 09/844,643, which is assigned to the assignee of this application. Also, inverse dispersion fiber according to embodiments of the invention is suitable for use with positive dispersion, pure silica core fiber from Sumitomo Electric Industries, Ltd. See, e.g., "Ultra Low Nonlinearity Low Loss Pure Silica Core Fiber," Electronics Letters Online No: 19991094, Aug. 3, 1999. Also, inverse dispersion fiber according to embodiments of the invention is suitable for use with, e.g., Vascade 100 fiber from Corning and large effective area fiber form Fujitsu.

Figure 5A:
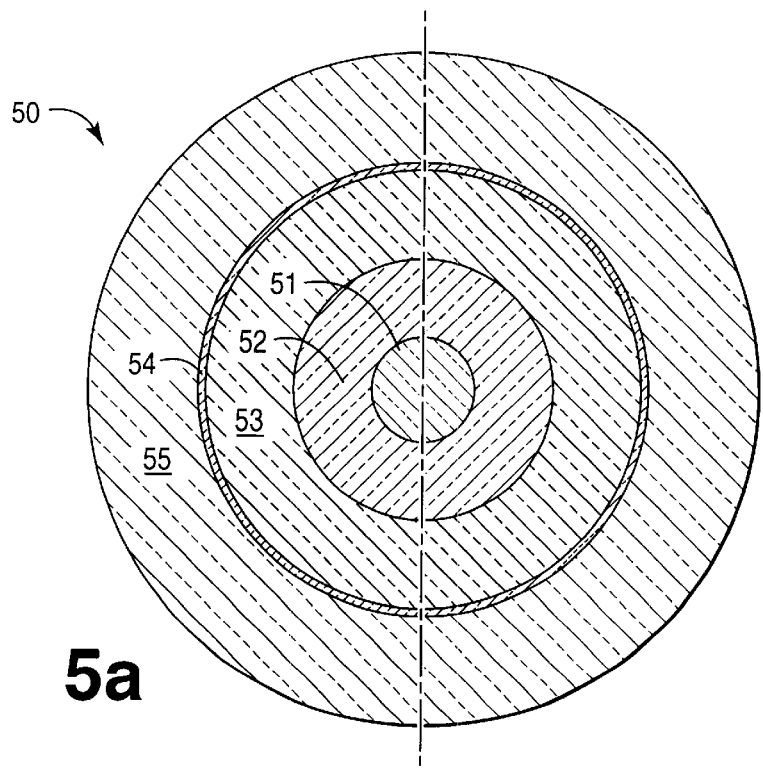
FIG. 5a is a cross-section view of an inverse dispersion optical fiber according to embodiments of the invention.
Figure 5B:
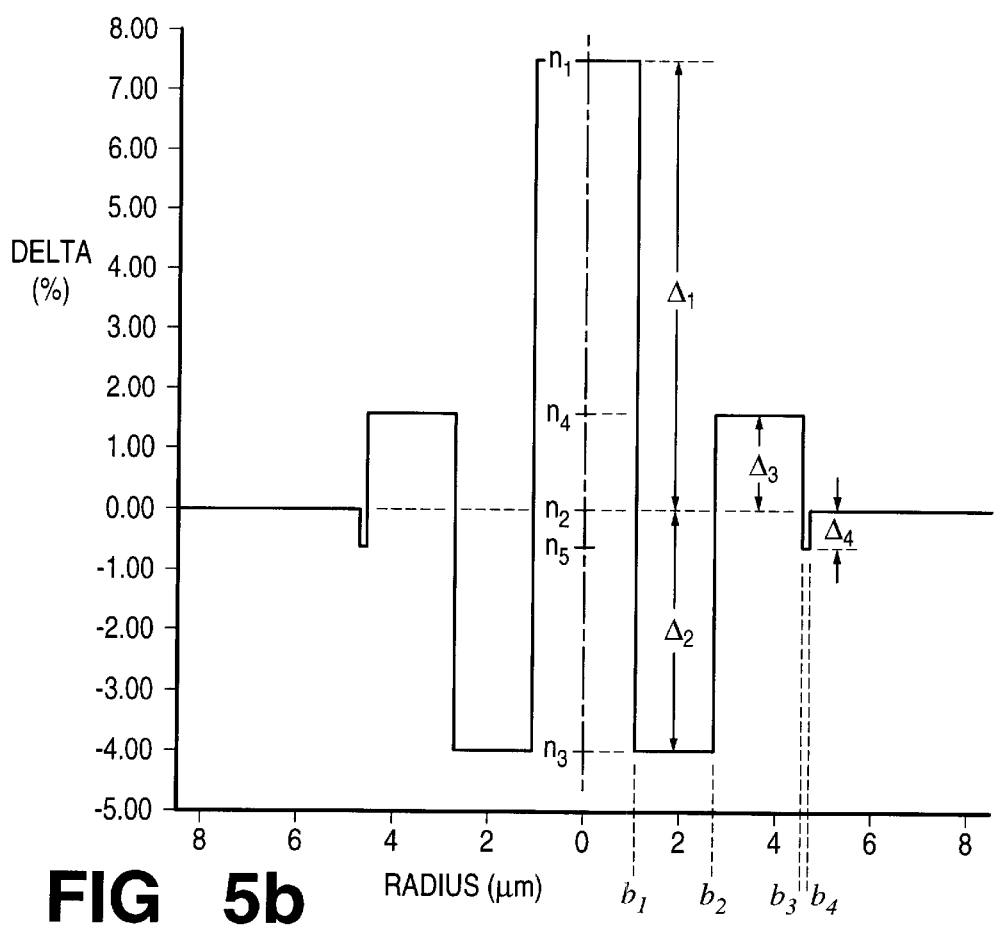

As discussed previously herein, the overall dispersion of an optical fiber generally results from the combination of material dispersion, which depends on the actual material(s) used in making the optical fiber, and waveguide dispersion, which is a function of the refractive-index profile of the fiber. Referring now to FIGS. 5a–b, shown is a cross-section view of a dispersion compensating optical fiber or inverse dispersion fiber 50 according to embodiments of the invention (FIG. 5a) and its corresponding refractive index profile (FIG. 5b). The optical fiber 50 according to embodiments of the invention includes a plurality of layers 51, 52, 53, 54, having a different index of refraction for modifying the waveguide dispersion characteristic of the fiber 50.

The optical fiber 50 comprises a central core region 51, whose index of refraction nominally is $n_1$. The central core region 51 is surrounded by a first annular ring or region 52 (trench region), which has a nominal refractive index $n_3$. The first region 52 is surrounded by a second annular ring or region 53 (first barrier region), which has a nominal refractive index $n_4$. The second region 53 is surrounded by a third annular ring or region 54 (second barrier region), which has a nominal refractive index $n_5$. An outer cladding 55 of nominal refractive index $n_2$ surrounds the third region 54. It should be noted that FIG. 5a is not drawn to scale (the diameter of cladding layer 55 is approximately 125 μm, while the diameter of the core region 51 is, e.g., less than approximately 6 μm). Also, as will be discussed in greater detail hereinbelow, because of the relative refractive index values of the various regions, and to a certain extent their functionality, for purposes of discussion herein, the first region 52 often is referred to as a trench region, the second region 53 often is referred to as a first barrier region, and the third region 54 often is referred to as a second barrier region.

Although the layers 51–55 suggest that changes in refractive index are abrupt between layers, such is not necessarily the case. Often, index changes between adjacent layers are gradual, resulting in graded index fibers. However, to facilitate an understanding of embodiments of the invention, abrupt changes are shown. It is understood that embodiments of the invention contemplate graded index fibers.

As shown in FIG. 5b, the refractive index profile according to embodiments of the invention comprises a doped core region, a trench region having an index of refraction less than that of the core region, a first barrier region having an index of refraction greater than that of the trench region, a second barrier region having an index of refraction less than that of the first barrier region but greater than that of the trench region and an outer cladding or cladding region having an index of refraction greater than those of the trench region and the second barrier region but less than that of the first barrier region and the core. The core region has a radius $b_1$. The trench region has an outer radius $b_2$ and an inner radius is $b_1$. The first barrier region has an outer radius $b_3$ and an inner radius $b_2$. The second barrier region has an outer radius $b_4$ and an inner radius $b_3$.

For example, the fiber profile reflects an arrangement comprising a germanium-doped silica core, a fluorine and/or germanium-doped trench region surrounding the core region, a germanium and/or fluorine-doped first barrier region surrounding the trench region, a germanium and/or fluorine-doped second barrier region surrounding the first barrier region, and a pure silica outer cladding surrounding the second region. Alternatively, the core region is co-doped with germanium and fluorine, or with other suitable co-dopants. Also, alternatively, one or more of the trench region, the first barrier region and the second barrier region are codoped with germanium and fluorine, or with other suitable co-dopants.

According to embodiments of the invention, the inventive refractive index profile provides negative dispersion, inverse dispersion, or dispersion compensating optical fiber with relatively large effective transmission area (i.e., effective core area, $A_{eff}$) and transmission characteristics that provide an improved dispersion slope match with conventional positive dispersion fibers such as those discussed previously herein. For example, according to embodiments of the invention, as shown in FIG. 5b, $\Delta_1$ is approximately 0.752%, $\Delta_2$ is approximately −0.399%, $\Delta_3$ is approximately 0.159% and $\Delta_4$ is approximately −0.062%. Also, in this particular arrangement, $b_1$ is approximately 2.18 μm (i.e., the core region diameter is approximately 4.36 μm), $b_2$ is approximately 5.46 μm (i.e., the trench region diameter is approximately 10.92 μm), and $b_3$ is approximately 9.14 μm (i.e., the first barrier region diameter is approximately 18.28 μm). Thus, the width of the trench region is approximately 3.28 μm (5.46 μm−2.18 μm), and the width of the first barrier region is approximately 3.68 μm (9.14 μm−5.46 μm). Also, according to an embodiment of the invention, $b_4$ is approximately 9.33 μm (i.e., the second barrier region diameter is approximately 18.66 μm), although such value can be varied more readily than other diameter values.

Although the previous discussions of embodiments of the invention shown in FIGS. 5a–b disclose specific values, it should be noted that, according to embodiments of the invention, the fiber qualities described are obtainable over a range of values for $\Delta_1$, $\Delta_2$ and $\Delta_3$, for example, wherein:

0.745%<$\Delta_1$<0.759%;

−0.403%<$\Delta_2$<−0.395%;

0.152%<$\Delta_3$<0.166%; and

−0.083%<$\Delta_4$<−0.041%.

Figure 6:
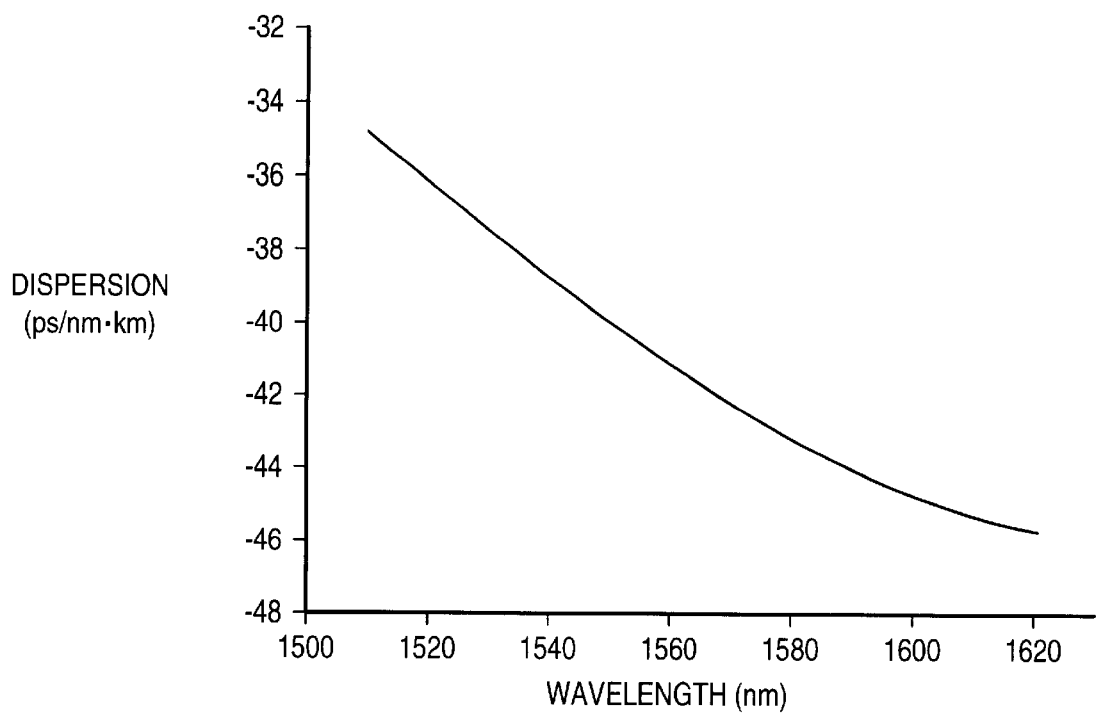
FIG. 6 is a graphical diagram of the dispersion as a function of wavelength for an optical fiber according to embodiments of the invention.
Figure 7:
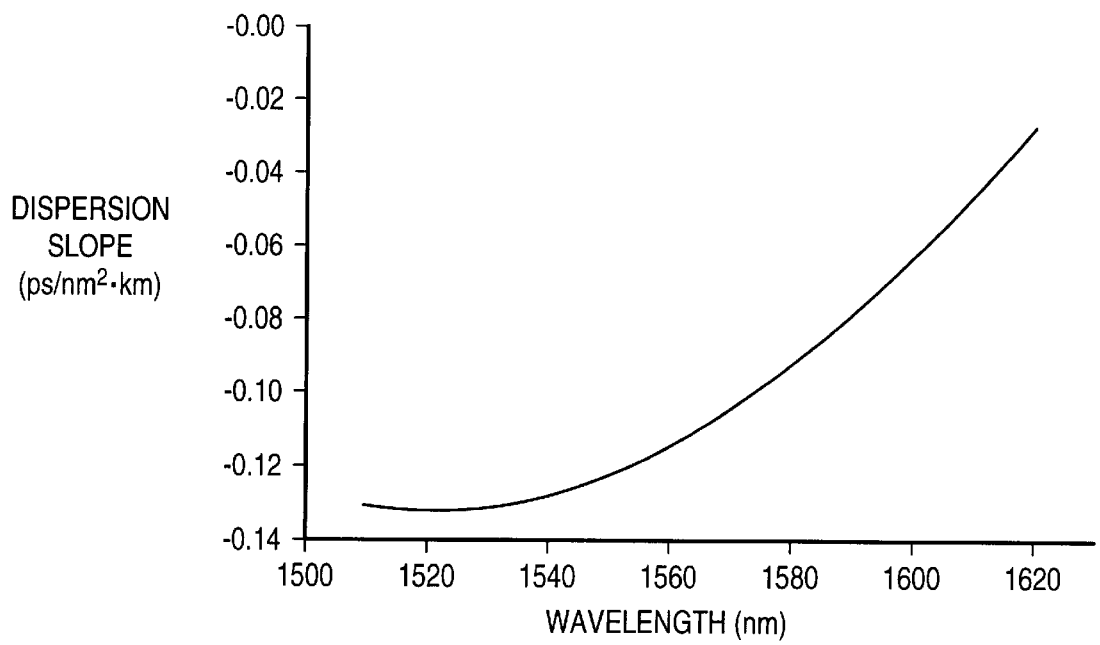
FIG. 7 is a graphical diagram of the dispersion slope as a function of wavelength for an optical fiber according to embodiments of the invention.

Referring now to FIG. 6, shown is a graphical diagram of the dispersion as a function of wavelength for inverse dispersion optical fibers according to embodiments of the invention. Referring now to FIG. 7, shown is a graphical diagram of the dispersion slope as a function of wavelength for inverse dispersion optical fibers according to embodiments of the invention.

Moreover, fiber arrangements according to embodiments of the invention have an effective core area, $A_{eff}$, greater than 30.0 μm² at a wavelength of 1550 nm. Also, the relative dispersion slope (RDS), which is the dispersion slope (at 1550 nm) divided by the dispersion (at 1550 nm), of fiber arrangements according to embodiments of the invention is approximately equal to that of the corresponding positive dispersion fiber, e.g., the RDS of optical fiber according to embodiments of the invention is approximately 0.00306 nm$^{-1}$.

Figure 8:
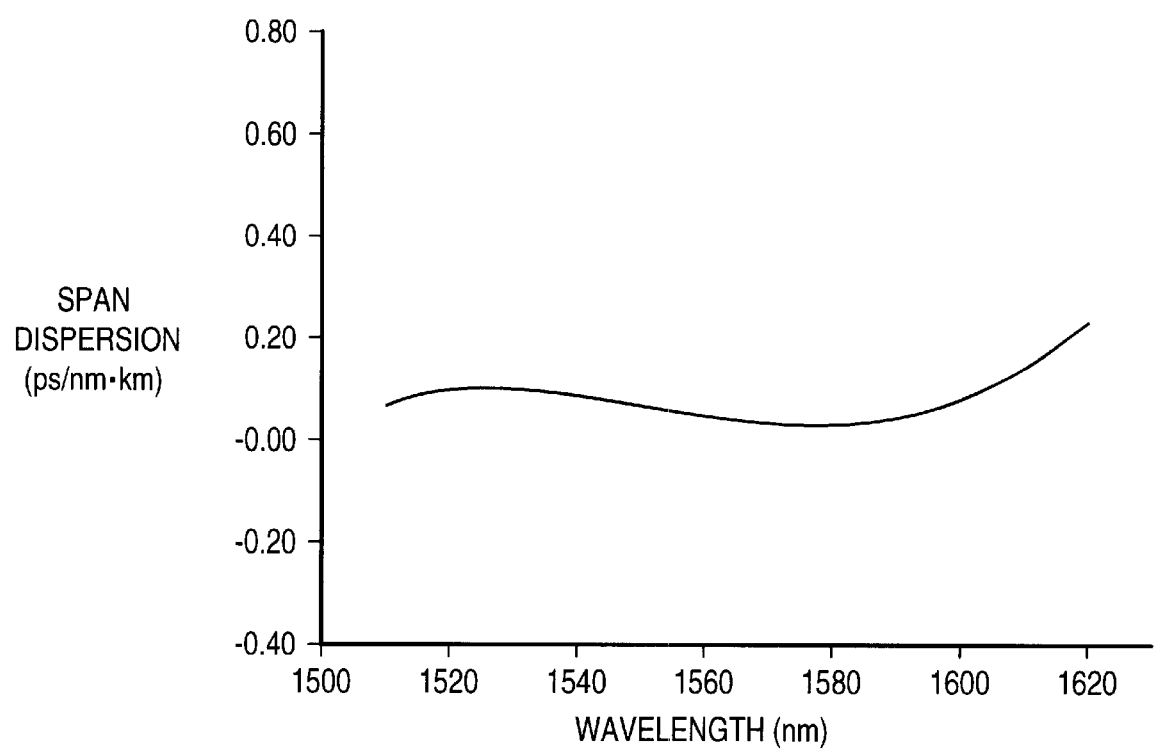
FIG. 8 is a graphical diagram of the dispersion as a function of wavelength for a transmission system using conventional positive dispersion fibers and negative dispersion fibers according to embodiments of the invention.

Referring now to FIG. 8, shown is a graphical diagram of dispersion as a function of wavelength for transmission systems using inverse dispersion optical fibers according to embodiments of the invention coupled to conventional positive dispersion fibers. For example, as shown in FIGS. 4a–b, the positive dispersion optical fiber (e.g., fiber 44) has a corresponding inverse dispersion optical fiber (e.g., fiber 46).

A specification table for a negative dispersion, inverse dispersion, or dispersion compensating optical fiber according to embodiments of the invention has been developed. However, the table is not intended to define the entire range of acceptable fibers and is presented only for illustrative purposes.

| ILLUSTRATIVE FIBER SPECIFICATION TABLE | |
|---|---|
| Effective core area (A$_{eff}$) at 1550 nm | ≧30 μm$^2$ (average) |
| Attenuation at 1550 nm | ≦0.249 dB/km (average) |
| Water peak | ≦0.510 dB/km (average) |
| Dispersion at 1550 nm | ≈−40 ps/(nm-km) (average) |
| Dispersion slope at 1550 nm | ≈−0.124 ps/(nm$^2$-km) (average) |
| Relative dispersion slope (RDS) at 1550 nm | ≈0.00306 nm$^{-1}$ (average) |
| Cable Cutoff wavelength (λc) | <1390 nm (average) |
| Mode field diameter (MFD) | ≧6.4 microns (1550 nm) |
| Macrobending at 1550 nm | ≦0.05 dB (1 loop, 32 mm) (median)<br><0.02 dB (100 loops, 60 mm) |

As the optical fiber according to embodiments of the invention is to be cabled, another important design tradeoff is between effective area and bending losses. Generally, a larger effective area results in higher bending losses. The effective area of a negative dispersion, inverse dispersion, or dispersion compensating optical fiber is much smaller than that of the its corresponding positive dispersion fiber. Thus, the effective area of the negative dispersion, dispersion compensating, or inverse dispersion optical fiber should be kept as large as possible to mitigate fiber nonlinear effects (and not be the limiting factor for WDM transmission). However, this should be done while keeping an acceptable bend loss performance in the cable.

For example, inverse dispersion fibers according to embodiments of the invention have measured macrobend loss wherein the attenuation median of a single 32 mm diameter loop is less than 0.05 dB at 1550 nm, and the attenuation of 100 loops of 75 mm diameter is below 0.01 dB at 1550 nm. With respect to microbend losses, inverse dispersion fibers according to embodiments of the invention have microbending losses slightly higher than, e.g., a matched-cladding single mode fiber, but lower than or comparable to conventional positive dispersion fibers such as those disclosed hereinabove, and lower than or comparable to conventional negative dispersion, positive dispersion slope fibers that conventionally are used as submarine fibers.

It will be apparent to those skilled in the art that many changes and substitutions can be made to the embodiments of the optical fibers herein described without departing from the spirit and scope of the invention as defined by the appended claims and their full scope of equivalents. Such changes and substitutions include, but are not limited to, refractive-index profiles that gradually taper between adjacent layers (e.g., graded-index profiles), the use of different doping materials to achieve the same general profile shapes, and the use of plastic materials (rather than glass) in making the optical fiber. Also, it is noted that in many practical fibers, an index depression exists at the center of the fiber due to the manufacturing process used in making the fiber. It is understood that even though some figures. herein show idealized profiles, embodiments of the invention contemplate such central depressions.

What is claimed is:

1. An optical fiber communications system, comprising:
   at least one source of optical energy;
   an optical fiber cable including at least one positive dispersion optical fiber coupled to the at least one source for transmitting optical energy from the source, and at least one inverse dispersion optical fiber coupled to the positive dispersion optical fiber,
   wherein the inverse dispersion optical fiber includes
      a doped core region having an index of refraction $n_1$,
      a cladding region having an index of refraction $n_2$, wherein $0.745\% < (n_1-n_2)/n_2 < 0.759\%$,
      a trench region between the doped core region and the cladding region and adjacent the doped core region, the trench region having an index of refraction $n_3$, wherein $-0.403\% < (n_3-n_2)/n_2 < -0.394\%$,
      a first barrier region between the doped core region and the cladding region and adjacent the trench region, the first barrier region having an index of refraction $n_4$, wherein $0.152\% < (n_4-n_2)/n_2 < 0.166\%$, and
      a second barrier region between the doped core region and the cladding region and adjacent the first barrier region, the second barrier region having an index of refraction $n_5$, wherein $-0.083\% < (n_5-n_2)/n_2 < -0.041\%$, and
   at least one receiver coupled to the invention dispersion optical fiber for receiving optical energy from the source.

2. The system as recited in claim 1, wherein the inverse dispersion optical fiber has an effective core area, $A_{eff}$, that is greater than 30.0 μm$^2$ at a wavelength of 1550 nm.

3. The system as recited in claim 1, wherein the optical fiber has a relative dispersion slope (RDS) that is approximately 0.00306 nm$^{-1}$ at a wavelength of 1550 nm.

4. The system as recited in claim 1, wherein the inverse dispersion optical fiber has a chromatic dispersion of approximately −40 picosecond/(nanometer-kilometer) at a wavelength of 1550 nm.

5. The system as recited in claim 1, wherein the inverse dispersion optical fiber has a mode field diameter (MFD) that is greater than 6.4 μm at a wavelength of 1550 nm.

6. The system as recited in claim 1, wherein the radius of the doped core region is approximately 2.18 μm, the width of the trench region is approximately 3.28 μm and the width of the first barrier region is approximately 3.68 μm.

7. An optical fiber, comprising:
   a doped core region having an index of refraction $n_1$;
   a cladding region having an index of refraction $n_2$;
   a trench region between the doped core region and the cladding region and adjacent the doped core region, the trench region having an index of refraction $n_3$;
   a first barrier region between the doped core region and the cladding region and adjacent the trench region, the first barrier region having an index of refraction $n_4$; and
   a second barrier region between the doped core region and the cladding region and adjacent the first barrier region, the second barrier region having an index of refraction $n_5$, wherein the optical fiber has a chromatic dispersion of approximately −40 picosecond/(nanometer-kilometer) and an effective core area, $A_{\textit{eff}}$, that is greater than 30.0 µm at a wavelength of 1550 nm.

8. The fiber as recited in claim 7, wherein the doped core region, the cladding region, the trench region, the first barrier region and the second barrier region are configured in such a way that $0.745\% < (n_1-n_2)/n_2 < 0.759\%$, $-0.403\% < (n_3-n_2)/n_2 < 0.394\%$, $0.152\% < (n_4-n_2)/n_2 < 0.166\%$, and $-0.083\% < (n_5-n_2)/n_2 < -0.041\%$.

9. The fiber as recited in claim 7, wherein the optical fiber has a relative dispersion slope (RDS) that is approximately 0.00306 nm$^{-1}$ at a wavelength of 1550 nm.

10. The fiber as recited in claim 7, wherein the optical fiber has a mode field diameter (MFD) that is greater than 6.4 µm at a wavelength of 1550 nm.

11. The fiber as recited in claim 7, wherein the doped core region is doped with germanium, the trench region is doped with fluorine, the first barrier region is doped with germanium and fluorine, and the second barrier region is doped with germanium and fluorine.

12. The fiber as recited in claim 7, wherein the radius of the doped core region is approximately 2.18 µm, the width of the trench region is approximately 3.28 µm and the width of the first barrier region is approximately 3.68 µm.

13. A method for making an optical fiber, comprising the steps of:

forming a doped core region having an index of refraction $n_1$;

forming a trench region around the doped core region, the trench region having an index of refraction $n_3$;

forming a first barrier region around the trench region, the first barrier having an index of refraction $n_4$;

forming a second barrier region around the first barrier region, the second barrier region having an index of refraction $n_5$; and forming a cladding region around the second barrier region, the cladding region having an index of refraction $n_2$, wherein the doped core region, the cladding region, the trench region, the first barrier region and the second barrier region are formed such that $0.745\% < (n_1-n_2)/n_2 < 0.759\%$, $-0.403\% < (n_3-n_2)/n_2 < -0.394\%$, $0.152\% < (n_4-n_2)/n_2 < 0.166\%$, and $0.083\% < (n_5-n_2)/n_2 < -0.041\%$.

14. An optical fiber preform, comprising:

a doped core region having an index of refraction $n_1$;

a cladding region having an index of refraction $n_2$;

a trench region between the doped core region and the cladding region and adjacent the doped core region, the trench region having an index of refraction $n_3$;

a first barrier region between the doped core region and the cladding region and adjacent the trench region, the first barrier region having an index of refraction $n_4$; and a second barrier region between the doped core region and the cladding region and adjacent the first barrier region, the second barrier region having an index of refraction $n_5$, wherein the doped core region, the cladding region, the trench region, the first barrier region and the second barrier region are formed such that $0.745\% < (n_1-n_2)/n_2 < 0.759\%$, $-0.403\% < (n_3-n_2)/n_2 < -0.394\%$, $0.152\% < (n_4-n_2)/n_2 < 0.166\%$, and $0.083\% < (n_5-n_2)/n_2 < -0.041\%$.

* * * * *